United States Patent [19]
Paxton

[11] Patent Number: 4,989,078
[45] Date of Patent: Jan. 29, 1991

[54] STILL VIDEO CAMERA FOR RECORDING STEREO IMAGES ON A VIDEO DISK
[75] Inventor: K. Bradley Paxton, Webster, N.Y.
[73] Assignee: Eastman Kodak Company, Rochester, N.Y.
[21] Appl. No.: 232,249
[22] Filed: Aug. 15, 1988
[51] Int. Cl.⁵ .................. H04N 13/00; H04N 5/76
[52] U.S. Cl. .................................. 358/88; 358/342
[58] Field of Search ............... 358/88, 342, 108, 310, 358/91, 92, 102, 104, 909, 906, 335; 360/10.1

[56] References Cited
U.S. PATENT DOCUMENTS

| | | | |
|---|---|---|---|
| 2,756,363 | 7/1956 | Wright | 315/1 |
| 3,140,415 | 7/1964 | Ketchpel | 313/146 |
| 3,527,880 | 9/1970 | Gordon | 178/6 |
| 4,122,484 | 10/1978 | Tan | 358/3 |
| 4,190,856 | 2/1980 | Ricks | 358/88 |
| 4,429,328 | 1/1984 | Jones Jr., et al. | 358/89 |
| 4,516,157 | 5/1985 | Campbell | 358/108 |
| 4,523,226 | 6/1985 | Lipton et al. | 358/88 |
| 4,706,117 | 11/1987 | Schoolman | 358/88 |
| 4,719,507 | 1/1988 | Bos | 358/92 |
| 4,725,897 | 2/1988 | Konishi | 360/10.1 |
| 4,734,756 | 3/1988 | Butterfield et al. | 358/88 |
| 4,739,418 | 4/1988 | Iwahara et al. | 348/342 |
| 4,743,964 | 5/1988 | Allard et al. | 358/310 |

OTHER PUBLICATIONS
"Home-Use 3-D Video Disk", Screen Digest, Jan. 1986.
"From Lab to Lap", IEEE Spectrum, Jul. 1985, pp. 53-59.

Primary Examiner—Donald McElheny, Jr.
Attorney, Agent, or Firm—David M. Woods

[57] ABSTRACT

A stereo still video camera includes two image sensors for generating a pair of video signals corresponding to left and right stereoscopic images as would be seen by a human observer. By recording the video signals as separate fields on concentric tracks on a rotating video disk, the stereo recording is effected with minimal disruption of the existing still video (non-stereo) standard. The pair of video signals are sequentially processed and separately recorded in synchronism with a phase signal derived from the periodic rotation of the disk. The phase signal is similarly used to synchronize the playback of the recorded video signals with a stereo display device.

4 Claims, 3 Drawing Sheets

STILL VIDEO CAMERA FOR RECORDING STEREO IMAGES ON A VIDEO DISK

BACKGROUND OF THE INVENTION

1. Field of the Invention

The present invention relates to the field of still video imaging, and especially to a compact still video camera of the type that separately records both fields of a still video frame.

2. Description Relative to the Prior Art

A still video recording standard has been established in which a small, flexible magnetic disk is used to store up to 50 still video pictures. The recording format provides the option of storing a full frame (two circular tracks per picture) for 25 pictures, or a single field (one circular track per picture) for 50 pictures. According to this standard, a radial reference position is defined in relation to the disk by providing a small metal insert (referred to as the PG yoke) in a hub that supports the disk for rotation. The location of this insert is sensed continuously as the disk is rotated and a so-called PG pulse or signal is accordingly derived. The leading edge of the vertical synchronizing signal is then positioned seven horizontal lines ($\pm$ two lines) from the reference position, i.e., from the occurrence of the PG signal. In addition, for full frame recording, the PG signal serves as a reference for head switching. The standard calls for the rotation of the disk at 3600 r.p.m.; head switching, therefore, occurs at the field rate.

A stereo recording ordinarily depends on separately recording two displaced images corresponding to left and right eye perspective views. For example, in U.S. Pat. No. 4,523,226 two images from separate cameras are recorded on "left" and "right" reels of video tape. The video tapes are initially produced and later played back on recorders that are interlocked since synchronization between the left and right images is critical for quality stereo reproduction. Because such techniques employ specialized equipment and non-standard recording formats, a stereo system is ordinarily incompatible with existing non-stereo equipment. Besides adding manufacturing cost due to specialized components, it is difficult to market an expensive, incompatible format. There is a need, therefore, for a stereo system that couples into an existing video format without resort to highly specialized processing systems.

SUMMARY OF THE INVENTION

The stereo system of this invention utilizes existing features of the still video recording standard to record a stereo still video image on a video disk. Since non-stereo still video recording has each frame recorded in respective first and second video fields in spatially adjacent, concentric tracks on the disk, stereo recording parallels this format by recording the displaced left and right images as the first and second video fields. Two image sensors are provided for sensing light from a subject and generating first and second video signals corresponding to the displaced images. By synchronizing the stereo processing of these signals to the periodic rotation of the disk, the left and right stereo images are separately recorded on separate concentric tracks on the disk. In addition, the video signals may be multiplexed through a single channel of camera electronics to the rotating disk—just as with a conventional, non-stereo image. Playback is also synchronized to the rotating disk, thus yielding a complete stereo system that interfaces with standard still video recording with a minimum of disruption.

BRIEF DESCRIPTION OF THE DRAWINGS

The invention will be described with reference to the drawings, in which.

DETAILED DESCRIPTION OF THE PREFERRED EMBODIMENT

Because video cameras are well known, the present description will be directed in particular to elements forming part of, or cooperating more directly with, apparatus in accordance with the present invention. Elements not specifically shown or described herein may be selected from those known in the art.

Figure 1:
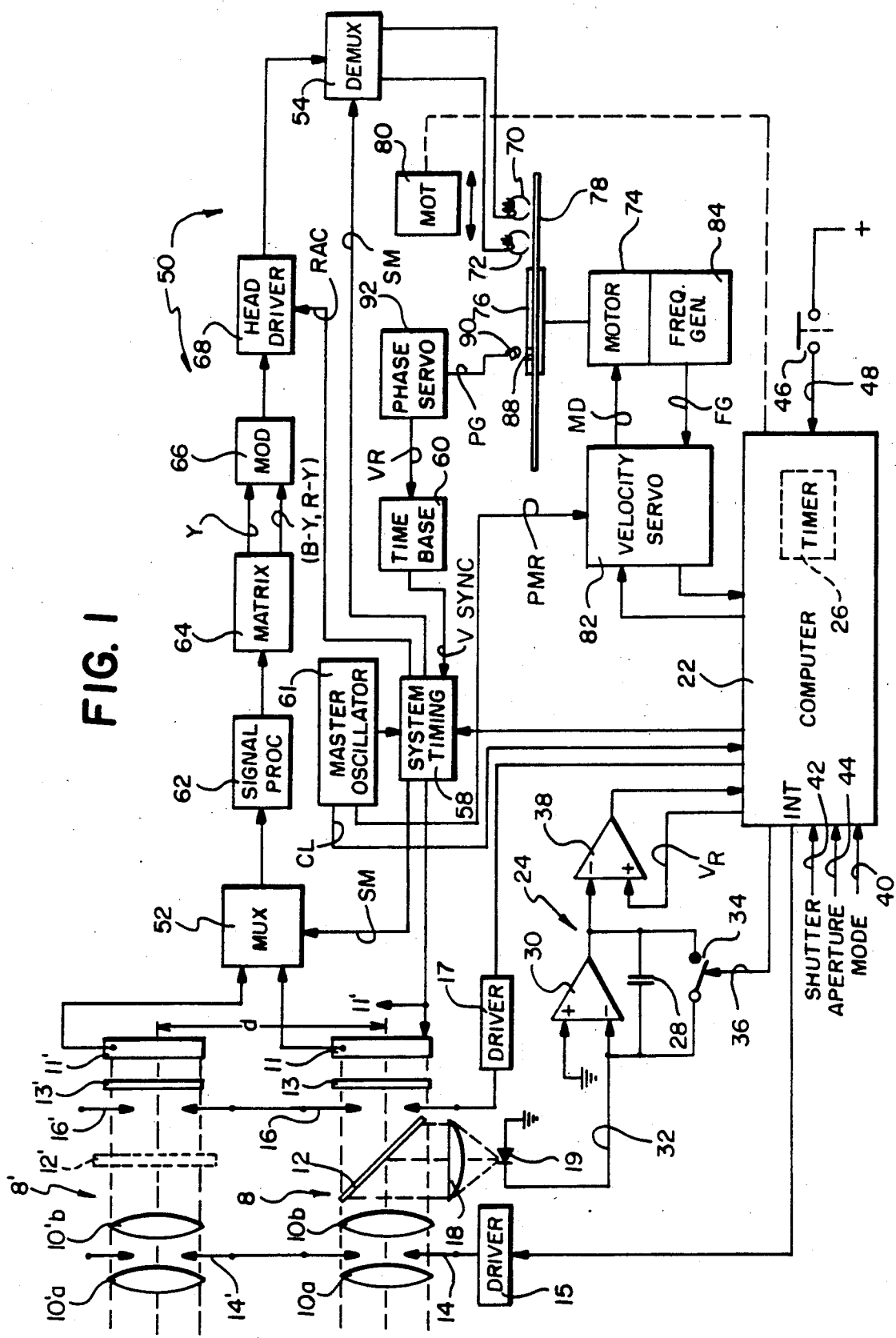
FIG. 1 is a block diagram of a still video camera adapted for stereo recording according to the invention.

Referring initially to FIG. 1, the pertinent sections of a still video camera are shown for purposes of describing the invention. Two optical systems are illustrated: a left optical section 8 for imaging the left stereoscopic field and a right optical section 8' for imaging the right stereoscopic field. An interaxial distance d separating the two optical sections corresponds to the interocular separation of a human visual system. The left optical section 8 includes lens elements 10a and 10b for directing image light from a subject (not shown) to an image sensor 11 through a partially transmissive mirror 12 and a color filter 13. A diaphragm 14 regulates the optical aperture (through which image light passes) by a linkage with a diaphragm driver 15. A shutter 16 regulates the exposure time (of image light upon the image sensor 11) by a linkage with a shutter driver 17. The right optical section 8' includes lens elements 10a' and 10b' for directing image light from the subject to an image sensor 11' through a color filter 13'. This light is axially offset by the distance d in relation to the light directed to the image sensor 11. A diaphragm 14' regulates the optical aperture of the right field by linkage with the diaphragm driver 15. A shutter 16' regulates the exposure time of the right field by linkage with the shutter driver 17. The shutter driver 17 and the diaphragm driver 15 thus commonly operate both shutters 16 and 16' and both diaphragms 14 and 14'. Ordinarily, both shutters and diaphragms will be set to the same exposure time and aperture values and operate in unison. Since a portion of the image light in the left field is removed by the mirror 12, it may be desirable to further equalize the exposures in both fields by inserting a neutral density filter 12' in the right field (which is shown by broken line to indicate that it is optional).

A control computer 22 regulates and controls the general operation of the camera, including the collection and processing of exposure information. As is well known, exposure is a function of light intensity and time, which are respectively controlled by the combined effect of the diaphragms 14 and 14' and the shutters 16 and 16'. Automatic control of the exposure parameters requires a light measurement, which is initiated by diverting a sample of the image light by means of the mirror 12 through a converging lens 18 upon an exposure photodiode 19. The grounded exposure photodiode 19 provides a circuit path for the flow of photocurrent to a measuring circuit 24. The circuit 24, which employs an integration cycle in its measuring process, cooperates with a counting procedure (exemplified by a software timer 26) in the computer 22 to arrive at a brightness value of the image light. The measuring circuit 24 includes an integrator composed of a capacitor 28 connected between the inverting input and the output of an operational amplifier 30. The output of the amplifier 30 is an integral over time of the photocurrent produced by the photodiode 19 and applied on a line 32 to the inverting input of the amplifier 30. A reset switch 34 is connected across the capacitor 28 for resetting the circuit 24 according to the condition of a signal INT on a line 36 from the computer 22.

The output voltage of the amplifier 30 and a reference voltage $V_R$ are provided to a comparator 38. The value $V_R$ is output as a digital number from the computer 22 and converted into an analog voltage by a digital-to-analog (D/A) converter (not shown). The output voltage of the amplifier 30 increases until it equals the reference voltage $V_R$. When equality occurs, the output of the comparator 38, which is connected to the computer 22, changes state, thereby indicating the end of an integration cycle. The timer 26 is zeroed at the beginning of an integration cycle and stopped when the comparator 38 changes state. The value of the timer 26 at that moment therefore represents the integration time, which corresponds to the brightness of the light received by the photodiode 19.

The timer value, that is, the value representative of the brightness of the image light, is conventionally processed in order to obtain aperture and/or exposure time values for operation of the diaphragms 14 and 14' and the shutters 16 and 16'. (The particular exposure algorithm employed for this calculation is unimportant in relation to the invention.) The still exposure mode is provided to the computer 22 on a line 40 (e.g., manual, automatic, aperture preferred or shutter preferred). If the mode is shutter or aperture preferred, either a shutter or an aperture value is specified on a respective input line 42 or 44 and incorporated into the algorithm to calculate the other, unspecified value. If the selected mode is a fully automatic mode, both shutter and aperture values are generated according to the particular exposure algorithm employed. If the still mode is manual, and both values are specified, there is no requirement for automatic exposure control by means of the circuit 24, except perhaps to indicate suggested shutter and aperture combinations. Once the desired picture is framed in a viewfinder (not shown), recording is initiated by depressing the shutter switch 46 and activating a line 48, which is connected to the computer 22.

The video signals generated by the image sensors 11 and 11' represent left and right images of the subject as seen by the eyes of an observer positioned behind the sensors. Though actually representative of different images, it is desirable (although not necessary) to process both images in the same signal processing and recording circuit 50. For this reason an input multiplexer 52 and an output demultiplexer 54 are provided for time-division multiplexing of the left and right image signals through the circuit 50. A timing circuit 58 provides the signals for clocking image charge from the respective imagers 11 and 11', and further provides a stereo control signal SM for synchronizing the multiplexer 52 and the demultiplexer 54 to the respective video signals. A time base generator 60 produces the vertical and horizontal drive signals according to a video standard (NTSC, in this case) for driving the system. A master oscillator 61 generates the basic frequency signals from which other signals are derived, especially the system clock signal CL for system timing and a motor reference signal PMR for the recording circuit 50.

The video signal from the multiplexer 52 is applied to a signal processing circuit 62, which separates the colors (red, green and blue) and applies gain, white balance and gamma correction to the resulting signals. The color signals are applied to a matrix 64, which produces a luminance (Y) signal, and a line-sequential stream of color difference signals (B-Y, R-Y). The luminance signal and the color difference signals are input to a modulator 66, which provides a selected preemphasis to the input signals and frequency modulates a suitable set of carriers with the preemphasized signals. The modulated signals are amplified by a head driver circuit 68. When a record activate signal (RAC) is received from the system timing circuit 58, the head driver 68 applies the modulated signals to the demultiplexer 54. Two magnetic heads 70 and 72 are connected to the output of the demultiplexer 54.

The recording circuit 50 includes a disk drive motor 74 for engaging a central hub 76 of a magnetic disk 78 and for rotating the disk 78 adjacent the recording heads 70 and 72. The heads are moved in unison by a stepper motor 80 coupled to the control computer 22 for recording a plurality of concentric tracks in stereo pairs (which correspond to a plurality of stereo images). A conventional velocity servo circuit 82 compares a feedback signal FG from a frequency generator 84 (coupled to the motor 74) with the motor frequency reference signal PMR from the master oscillator 61. Pursuant to this comparison, the velocity servo 82 applies the motor drive signal MD to the motor 74 for driving the motor 74 at the standard rotational velocity (3600 r.p.m.).

A predetermined reference position is defined relative to the disk 78 by a metal insert 88 (the PG yoke) in the hub 76. A sensor 90 is mounted adjacent the hub 76 so that it generates a pulsating phase (PG) signal as the disk 78 is rotated (one pulse per revolution) and the insert 88 passes adjacent the sensor 90. It will be appreciated that the times recurrence of the pulsations in the PG signal corresponds to the angular or phase stability of the rotating disk, i.e., a variation in the PG signal represents a "wandering" of the reference position to which the vertical synchronizing signal is related. The PG signal is applied to a phase servo 92 which, according to variations in the PG signal, provides a reset signal VR to the time base generator 60. Control of phase is accomplished by utilizing the PG signal to reset the NTSC time base provided by the time base generator 60 such that the vertical synchronizing signal is forced to occur at the proper time in relation to the PG signal. The reset vertical synchronizing signal V sync is used in the system timing circuit 58 to generate the stereo control signal SM, since recording of the stereo signals corresponds to the phase of the rotating disk 78.

Figure 2:
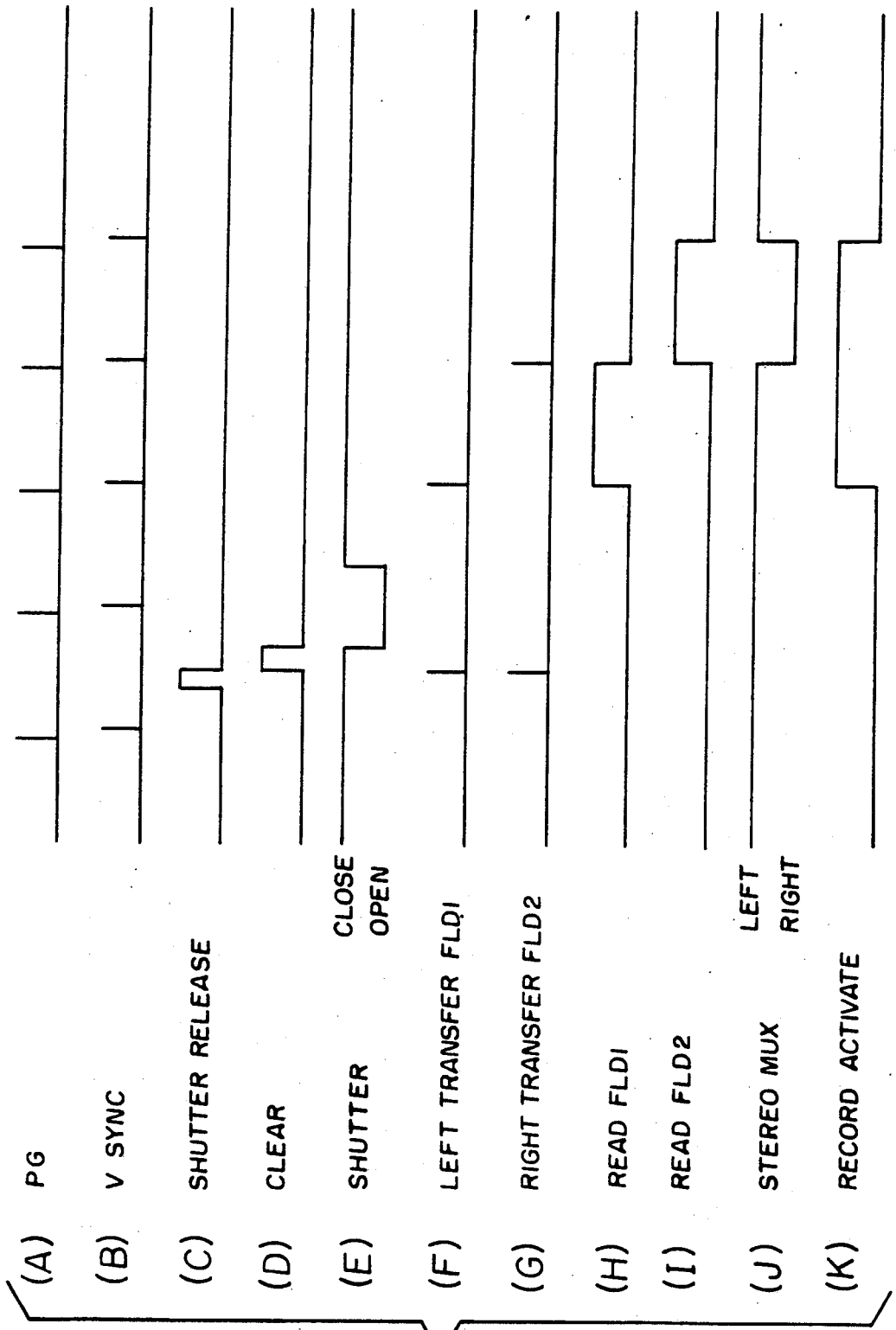
FIG. 2 is a waveform diagram of signals used in connection with the camera of FIG. 1.

FIG. 2 shows signal waveforms characteristic of the operation of the camera of FIG. 1 in the stereo mode. The PG pulses (FIG. 2(A)) initiate head switching and determine the position of the vertical synchronization pulses V sync (FIG. 2(B)) in relation to each revolution of the magnetic disk. A shutter release signal (FIG. 2(C)) appearing on the line 48 (FIG. 1) occurs asynchronously with respect to the vertical synchronization signal. Immediately after receipt of the shutter release signal, both images are simultaneously cleared of any residual charge (FIG. 2(D)). As soon as the imagers are cleared, both shutters 16 and 16' are opened (FIG. 2(E)) for the exposure period (as determined by the exposure circuit 24 and the computer 22).

Following the end of the exposure period, the shutters are closed and the charge is temporarily held on the imagers 11 and 11' until the next occurrence of a vertical synchronization pulse. During this time, a stereo multiplexer control signal SM enables the multiplexer 52 and the demultiplexer 54 and establishes a channel for the left stereo image (FIG. 2(J)). When the signal V sync goes high, the image charge in the left imager 11 is transferred to the vertical registers (FIG. 2(F)) and read out to the signal processing circuit 50 (FIG. 2(H)). When the record activate signal RAC is raised high, the left stereo image is recorded by head 70 on the disk 78. Then, with the record activate signal RAC remaining high, the stereo multiplexer control signal SM switches state (FIG. 2(J)) and the multiplexer 52 and the demultiplexer 54 establish a channel for the right stereo image. The right stereo image is transferred to the vertical registers (FIG. 2(G)) in synchronism with the signal V sync and read from the imager 11' (FIG. 2 (I)), to the signal processing and recording circuit 50. The right stereo image is then recorded on the disk 78 by the other magnetic head 72.

Figure 3:
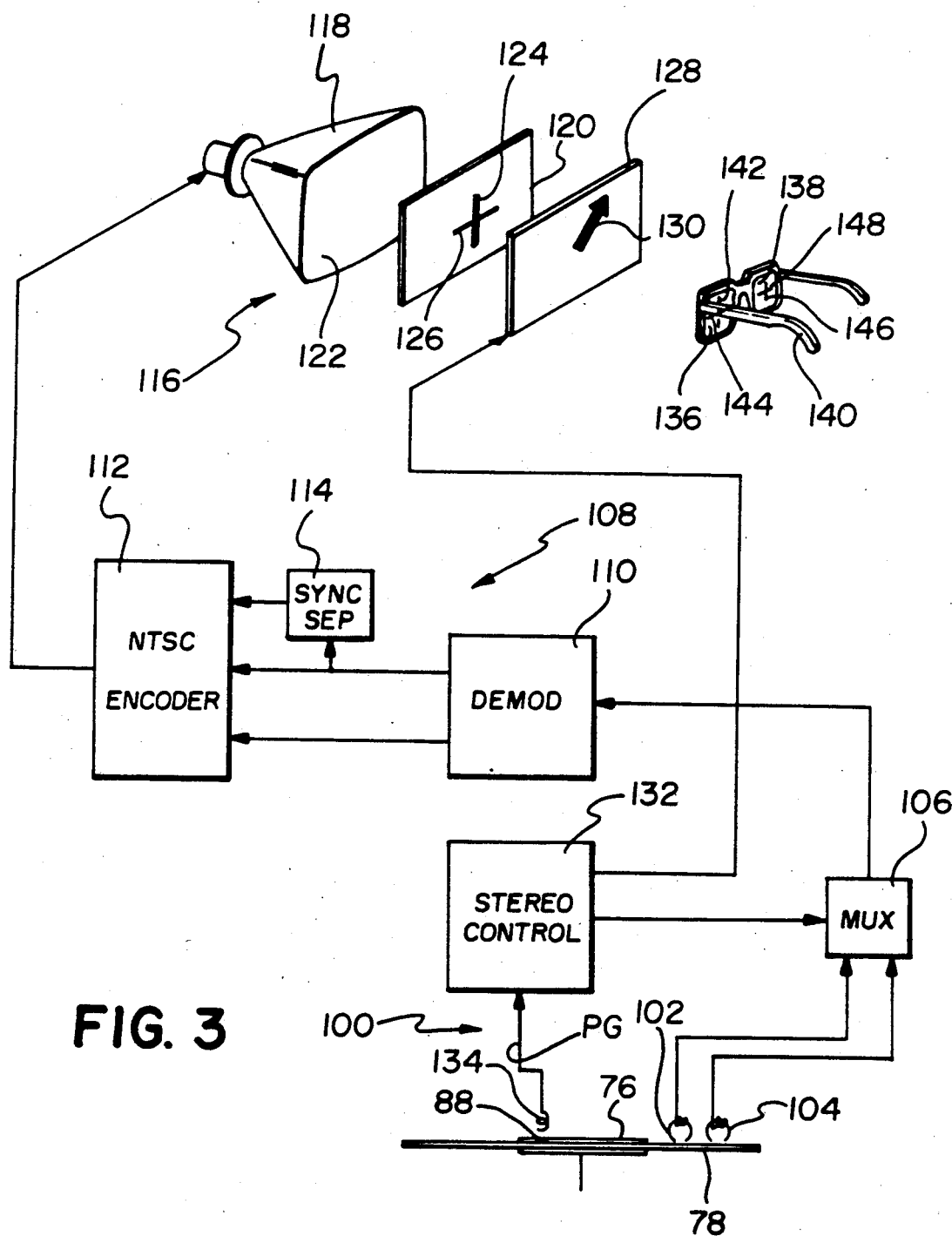
FIG. 3 is a block diagram of playback apparatus for reproducing stereo recordings made by the camera of FIG. 1.

FIG. 3 is a diagram of a stereoscopic player that may be used to view the recorded stereo images. The player includes a reproduction section 100 in which a prerecorded disk 78 is supported for rotation adjacent two playback heads 102 and 104. The disk drive, which is not shown, will be similar to the mechanism employed in the camera. The stereoscopic signals generated by the heads 102 and 104 are applied to a multiplexer 106, which multiplexes, by time division, each stereo field signal to a signal processing section 108. A demodulator 110 provides a luminance signal Y and a line sequential color signal R-Y, B-Y to an NTSC encoder 112. Synchronization information is separated from the luminance signal Y by a sync separator 114 an also provided to the NTSC encoder 112. The encoded video signal is applied to a known display section 116 (which is described in greater detail in U.S. Pat. No. 4,719,507).

The display section 116 includes a light source 118, such as a cathode ray tube, that produces in alternate sequence first and second display images of the first and second video signals from the tracks recorded on the disk 78. A first polarizing filter 120 is disposed face-to-face with the screen 122 of the cathode ray tube 118 and polarizes the light rays that emanate from the screen 122. The polarizing filter 120 is a neutral linear polarizer with a vertical absorption axis 124 and a horizontal transmission axis 126. Unpolarized light from the screen 122 will be absorbed except in the horizontal plane of the axis 126, thus providing an output of plane polarized light. The light rays carrying the first and second images exit polarizing filter 120 through its transmission axis 126 and strike a variable optical retarder 128, which is tuned to provide half-wave retardation for green light. The optic axis 130 of the variable optical retarder 128 is dispose at substantially a 45° angle with respect to the polarization axes 124 and 126 of the polarizing filter 120. The operation of the variable optical retarder 128 is synchronized to the first and second video fields by signals from a stereo control network 132.

The stereo control network 132 receives a PG signal from the playback PG sensor 134. As with recording, the position of the PG insert 88 in the hub 76 defines the beginning of each recorded field signal. The stereo control network 132 therefore provides first and second output signals to the variable optical retarder 128 and to the multiplexer 106 in synchronism with the receipt of PG signals. The multiplexer 106 is switched accordingly to direct alternate fields through the signal processing section 108 to the display section 116 while the variable optical retarder 128 develops, respectively, first and second amounts of optical retardation. Variable optical retarder 128 provides essentially zero retardation in a field-aligned or "ON" state to transmit horizontally polarized light rays of the first image and substantially half-wave retardation in a partly relaxed or "OFF" state to transmit vertically polarize light rays of the second image. An exemplary variable optical retarder is a liquid crystal cell; for example, a pair of generally parallel, spaced-apart electrode structures with nematic liquid crystal material in between is described in U.S. Pat. No. 4,719,507 for use in this type of display system.

The light rays exiting the variable optical retarder 128 strike first and second viewing lenses 136 and 138, which are positioned alongside each other and form the eye pieces for glasses 140 that are worn by an observer. The first viewing lens 136 comprises a second neutral polarizing filter having a vertical transmission axis 142 and a horizontal absorption axis 144, and the second viewing lens 138 comprises a third neutral linear polarizing filter having a vertical absorption axis 146 and a horizontal transmission axis 148.

Whenever the variable optical retarder 128 provides essentially zero retardation in the "ON" state, the horizontally polarized light rays carrying the first image strike the viewing lenses 136 and 138. The absorption axis 144 of the first lens 136 blocks the first image from the observer's left eye, and the transmission axis 148 of the second lens transmits the first image to the observer's right eye. Whenever the variable optical retarder 128 provides approximately half-wave retardation in the "OFF" state, the vertically polarized light rays carrying the second image strike the lenses 136 and 138. The transmission axis 142 of the first lens 136 transmits the second image to the observer's left eye and the absorption axis 146 of the second lens 138 blocks the second image from the observer's right eye. Alternately blocking and transmitting the image for each eye thus creates the visual effect of a three-dimensional image of the scene. In this display system, the left stereo field imaged through the left optical section 8 (FIG. 1) will be transmitted through the (left) viewing lens 136 and the right stereo field imaged through the right optical section 8' will be transmitted through the (right) viewing lens 138.

The invention has been described in detail with particular reference to a presently preferred embodiment, but it will be understood that variations and modifications can be effected within the spirit and scope of the invention.

What is claimed is:

1. A still video camera for recording a stereo image of a subject on a video disk as separate video fields, said video disk including a phase indicator in a hub region thereof for defining the beginning of a field relative to a track on the disk; said still video camera comprising:

a first image sensor for sensing the subject and generating a first video signal corresponding to the first field of the image;

a second image sensor for sensing the subject and generating a second video signal corresponding to the second field of the image, said second sensor displaced from said first sensor by a distance corresponding to the interocular separation of a human observer in order to produce a stereo effect in the respective video signals;

means for simultaneously exposing said first and second image sensors to the subject, thereby producing simultaneously-exposed first and second still video signals;

signal processing means for generating respective first and second recording signals from said first and second still video signals, said first recording signal corresponding to the first field of the image and said second recording signal corresponding to the second field of the image;

means for rotating the video disk;

means for sensing the phase indicator on the rotating video disk and generating a phase signal therefrom;

first recording means for recording the first recording signal on a first circular track on the video disk;

second recording means for recording the second video signal on a second circular track that is concentric to said first track on the same disk side thereof; and timing means responsive to the occurrence of said phase signal for applying said first and second recording signals to said first and second recording means to record said first and second video fields in concentric tracks as a stereo field pair.

2. A camera as claimed in claim 1 wherein said signal processing means includes:

a signal processing section of or generating the first and second recording signals;

a time-division multiplexer for applying the first and second still video signals in a time-divided sequence to said signal processing section, thereby generating a time-divided sequence of recording signals; and said timing means including a de-multiplexer for separating the time-divided sequence of recording signals into the first and second recording signals, said separated recording signals therewith applied by said timing means to respective recording means in response to said phase signal.

3. A camera as claimed in claim 2 in which said timing means further operates said multiplexer in response to said phase signal.

4. A camera as claimed in claim 3 in which said phase signal sensing and generating means operates in synchronism with the rotating disk to generate a phase pulse for each revolution of the rotating disk and said timing means operates in synchronism with the phase pulse for alternately directing said first and second still video signals through said signal processing section.

* * * * *

UNITED STATES PATENT AND TRADEMARK OFFICE
CERTIFICATE OF CORRECTION

PATENT NO. : 4,989,078
DATED : January 29, 1991
INVENTOR(S) : K. Bradley Paxton

It is certified that error appears in the above-identified patent and that said Letters Patent is hereby corrected as shown below:

Column 8, line 8, "of or" should read --for--.

Signed and Sealed this

Twenty-seventh Day of October, 1992

*Attest:*

DOUGLAS B. COMER

*Attesting Officer*     Acting Commissioner of Patents and Trademarks